April 15, 1969

R. LEHLE 3,438,278

GEAR UNITS FOR COUNTERS

Filed March 20, 1967

INVENTOR
ROBERT LEHLE

BY  *Dicker & Craig*

ATTORNEYS

United States Patent Office 3,438,278
Patented Apr. 15, 1969

3,438,278
GEAR UNITS FOR COUNTERS
Robert Lehle, Oberndorf, Germany, assignor to Messrs. Feinwerkbau Westinger & Altenburger KG, Oberndorf, Germany
Filed Mar. 20, 1967, Ser. No. 624,270
Int. Cl. F16h 55/22
U.S. Cl. 74—435                                    7 Claims

ABSTRACT OF THE DISCLOSURE

A counter having a worm and worm gear input, the worm gear driving an offset mutilated spur gear which, in turn, drives a pinion having a part of every other tooth axially shortened to provide means to lock the pinion against rotation. The pinion drives a spur gear coupled to an output shaft. Several stages of mutilated gears and pinions may be utilized.

---

The invention relates to a gear unit, more particularly to a reduction gear unit for counters. Counters are used to record a certain value as a function of the rotation of a shaft, while the relation between said value and said shaft revolutions may be manifold.

Accordingly, the reduction ratios required for recording certain measured values in relation to the shaft rotations are very different from case to case. With textile machines, for example, the length of the spooled thread or of a manufactured product is determined as a function of the revolutions of a suitable shaft. Depending on the machine design and the processed materials, this application requires widely varying transmission ratios by means of which the shaft revolutions can be set into proper relation to the length of the spooled thread or the product manufactured. With most applications, however, the required reduction ratios are very high.

Especially with regard to textile machines, counter gear units of multiple-stage worm drive design have been in use. This type of worm gearing has the disadvantage of being relatively expensive in manufacture and of requiring much space. Since the dimensions of these gear units are more or less equal to, or even larger than, the counters with which they cooperate, it is the gear unit that defines the mounting position of a counter, which often is the cause of considerable difficulties. Another remarkable disadvantage of these gear units is their very limited adaptability to varying drive systems, since a variety of worm gears with different numbers of teeth are required to obtain a major number of various transmission ratios.

The object of the present invention is to overcome the disadvantages of the prior art gear units and to permit the construction of gear units for counters featuring very simple configuration and little space requirements. The present invention comprises a gear unit having at least one pair of gears coupled with each other, the driving gear of which is bare of teeth along a certain portion of its periphery, whereby no motion is transmitted to the driven gear during a certain portion of each revolution of the driving gear. The gear unit according to the invention permits utilization of simple spur gears which can be manufactured easily and inexpensively, for example by stamping, and which can be arranged in an extremely space-saving manner. High transmission ratios are obtained simply by removing the major part of the teeth from the periphery of the driving gear in order to ensure that of each revolution of the driving gear the driven gear is indexed forward through a small angle. Another important advantage of this invention is that for the manufacture of gear units with different reduction ratios identical gears may be used, the different reduction ratios being obtained by merely removing a smaller or larger number of teeth from the driving gear of a pair of gears, which can be achieved by means of a very simple punching device. As will be readily understood the output shaft of the gear unit according to the invention does not rotate steadily, as is the case with prior art gear units, but stepwise. However, this is by no means a disadvantage, because driving a counter does not require a continuous rotation of the counter drive shaft; but only a certain transmission ratio maintained between the speed of the shaft to be monitored and that of the counter input shaft. Considering that at least the higher digit figure discs of counters with conventional gear units are driven stepwise, it is immaterial whether or not the lower digit figure discs also are driven stepwise.

It is evident that the present invention employs the same principle that has been in use for scores of years with decade transfer in counters. According to the present invention this principle is now employed for the first time in the manufacture of counter reduction gear units and the like which do not require a steady drive and thus to permit the manufacture of gear units in a wide range of reduction ratios using the same components.

Gear units can be imagined in which the coupled gears of a pair of gears are in direct mesh. For a more compact design of the gear unit, however, a further feature according to the present invention enables the pair of gears to be coupled together by a pinion so that the gears of a pair to be coupled together can be arranged one behind the other on one axle. Also, several of these pairs of gears can be arranged on a common axis, whenever required.

A further embodiment of the invention enables the pinion to be provided with a portion arranged behind its toothing and having recesses designed to receive projections on the toothless portion of the driving gear periphery and thereby to obtain a blocking effect. This ensures that the rotation of the driven gear will be stopped when the teeth of the driving gear move out of mesh with the teeth of the driven gear. In particular this arrangement can be designed similarly to that used in counters, in that every second tooth in the locking portion of the pinion is removed, and the driving gear is equipped with a disc-shaped segment axially displaced in relation to the toothing, which segment is in mesh with the corresponding tooth gaps of the pinion. Again, this arrangement is largely identical to the device in use with the decade transfer in counters.

In an especially preferred embodiment of the present invention, the driving gear of a first gear pair is mounted sideways to the worm gear of a worm drive. The axle accommodating this worm gear also holds the driven gear of the said first pair plus a second pair of gears with the driving gear of the second pair mounted sideways to the driven gear of the first pair. In a preferred embodiment of the present invention, the driving gear is a disk-shaped member having one laterally cranked out segment, the curved rim of which is toothed. This type of gear can be easily produced by a simple punching operation.

The gear unit according to the invention can be built to dimensions remarkably smaller than those of the counter with which it is to cooperate. This is especially true whenever the gear unit according to the invention is used to drive multiple shift counters on textile machinery. The dimensions of the gear unit according to the invention being small in relation to the counter size permit the gear unit to be mounted on the counter in any desired position. Unlike the prior art gear units which due to their size form an integral unit with the counter, the present invention permits the assembly of counters and gear units to be carried out in many different ways. For example, the size of the prior art gear units permits the incorporation of multiple shift counters for textile machines into control panels etc. On the other hand, the present invention offers numerous possibilities, since the very small reduction gear unit may be attached to the counter in any desired manner with minimal space requirements, thus permitting, for example, the incorporation of counters into control panels.

Further details and modifications of the present invention will be apparent from the following description and are illustrated in the accompanying drawing which by way of example shows one embodiment of the invention.

Figure 1:
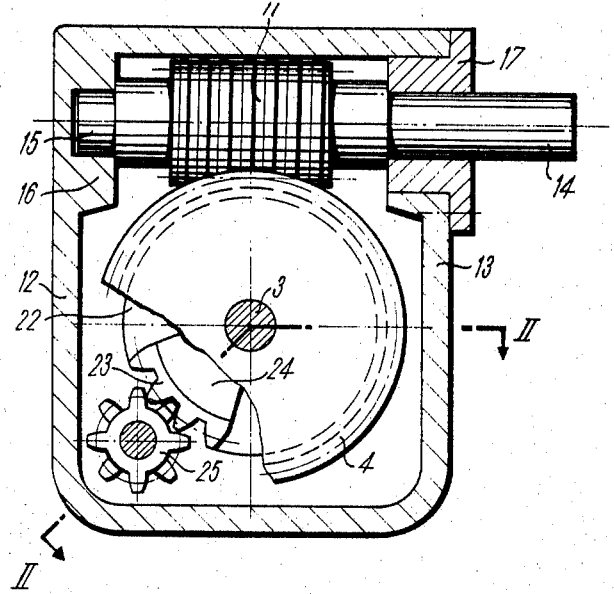
FIG. 1 is a sectional view taken on line I—I of FIG. 2 of the gear unit according to the invention.
Figure 2:
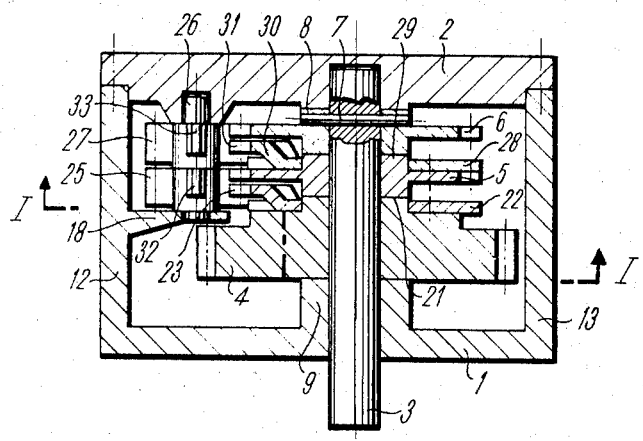
FIG. 2 is a sectional view taken on line II—II of FIG. 1.

A shaft 3 is mounted to rotate between a bottom 1 and cover 2 of a generally cup-shaped housing on which shaft a worm gear 4 and two gear wheels 5 and 6 are axially arranged one behind the other. While the worm gear 4 and gear wheel 5 are mounted to rotate on shaft 3, a gear wheel 6 is locked on shaft 3 by means of a pin 7 arranged to pass through the hub of gear wheel 6, which in turn is formed by the shoulder 8. While the shoulder 8 of gear weel 6 rests against the inside of the housing cover 2, the outer end face of worm gear 4 rests against a shoulder 9 of the housing bottom 1. Thus the assembly consisting of worm gear 4 and the gear wheels 5 and 6 is rigidly locked in place in the direction of shaft 3 between the housing bottom 1 and the cover 2. Shaft 3 also is firmly held in place in the housing.

The worm gear 4 is driven by a worm 11 which is mounted in such a way on a shaft 14 in its turn carried in the housing side walls 12 and 13 that its toothing is kept in mesh with worm gear 4. The shoulder 15 of shaft 14 is directly fitted into a reinforced portion 16 of housing 12, while the other end of said shaft 14 is supported by a sleeve 17 inserted into the housing wall 13.

Mounted on shoulder 21 formed by the hub of worm gear 4 and facing the neighboring gear 5 is a geared disk 22 having a toothing 23 provided on only a portion of its periphery. This toothing is located on a generally segment-shaped section 24 of said disk 22 which is cranked out of disk 22 in direction of the neighboring gear 5. The toothing 23 of disk 22 is arranged in the same circular plane around the axis of shaft 3 as the toothing of gear 5. Gear 5 and toothing 23 mesh with a common pinion 25 mounted to rotate freely on a pin 26 supported by the housing cover 2 and an arm 18 extending from housing wall 12. This pin accommodates a second pinion 27 which is equally in mesh with a geared disk 28 and gear 6. Disk 28 is located on a shoulder 29 forming the hub of gear 5 and mounted to the side of gear 5 which faces gear 6. The geared disk 28, too, has a segment-shaped portion 30 cranked out in the direction of gear 5, its circular-shaped rim carrying the toothing 31 which is in mesh with pinion 27. Shaft 14 acts as the input shaft of the gear unit. Rotation of this shaft causes worm gear 4 to rotate at a slower speed which corresponds to the amount of teeth of the worm gear. Rotation of worm gear 4 drives the geared disk 22. As long as the geared segment 23 of this disk is in mesh with pinion 25, gear 5 is driven via pinion 25. But pinion 25 and gear 5 stop rotating as soon as section 24 with its toothing 23 moves out of the range of pinion 25. In order to prevent further casual rotation of pinion 25 and of gear 5, the gearless rim of disk 22 engages mating recesses provided on pinion 25, thus preventing further rotation of the pinion. These recesses are obtained by shortening every second of the total of eight teeth of pinion 25, as is the case with teeth 32 and 33 of the pinions 25 and 27. The teeth 32 and 33 are just long enough to permit the teeth 30 and 31 which are laterally displaced in relation to the disks 22 and 28, together with the closely neighboring gears 5 and 6 to engage teeth 32 and 33, but not the gearless portions of the disks 22 and 28, which are designed to function as locking disks.

Each revolution of the worm gear 4 rotates pinion 25 and gear 5 only by an angular distance corresponding to the aperture angle of segment 24 of the geared disk 22. Similarly a full revolution of gear 5 rotates gear 6, which cooperates via pinion 27 with the geared disk 28 mounted to gear 5, by the angular value corresponding to the aperture angle of the geared segment 30 of the geared disk 28. Accordingly the speed is reduced between the geared disk 28, gear 5 respectively, and gear 6 by a ratio equal to the ratio between segment 30 and the full circle. The reduction between input shaft 14 and output shaft 13 which is driven by gear 6 is equal to the product of the reductions taking place between worm 11 and worm gear 4, worm gear 4 and gear 5, and finally gear 5 and gear 6.

In the illustrated embodiment the gears 5 and 6 each have 20 teeth. Also the teeth 23 and 31 of the geared disks 22 and 28 have a tooth pitch which corresponds to a total of 20 teeth around the periphery. The pinions 25 and 27 each have 8 teeth. The cooperation of the gearless segments of the disks 22 and 28 with the tooth gaps of the pinions 25 and 27 which are obtained by shortening every second tooth requires even tooth numbers for the geared segments 23 and 31. This permits generation of any desired reduction ratio from 1 to 10 between the geared disk 22 and gear 5 as well as between the geared disk 28 and gear 6 equal to the ratio between 20 and any even number between two and twenty. Thus the total reduction between worm gear 4 and output shaft 3 may be any product of these possible reductions between 1 and 100. The reduction at the input effected by worm 11 and worm gear 4 can thus be varied by the consecutive arrangements in a wide range and fine steps. Larger reduction ratios than 100:1 are readily obtainable by employing three or more transmission stages.

It is evident that the arrangement according to the present invention is marked by its very compact configuration, and it is a special advantage that the setting of a desired reduction ratio only requires the selection of the corresponding disks 22 and 28 rather than the replacement of entire gear trains using different numbers of teeth and different modules, as is the case with conventional gear units. The gear unit according to the invention does not require the distance between axles, or the modules, to be varied, nor are there any changes in power transmission. Thus the energy for the operation of the connected counter remains constant, no matter what reduction ratio is selected.

It is understood that the present invention is not restricted to the embodiment shown herein, but that variations are possible without leaving the scope of the present invention. For example, it is not absolutely necessary to arrange the gears and the pertaining pinions coaxially, though this form ensures an especially advantageous and compact configuration. Rather, applications can be imagined for which a different arrangement could be better suited. It would even be possible to provide for direct meshing of the gears forming a pair. More particularly, further deviations from the embodiment shown herein may be attributable to the fact that other embodiments incorporate only part, or a combination, of the features according to the invention.

I claim:

1. A reduction gear arrangement comprising an input drive shaft and an output driven shaft,
    at least one pair of spur gears operatively connected, at least one of each pairs of spur gears being operatively coupled for rotation with said input drive shaft, the other of each of said pairs of spur gears being coupled for rotation with said output driven shaft,
    said one of each of said pairs of spur gears coupled with said input drive shaft being free of teeth over at least a portion of its periphery, such that during a predetermined portion of each revolution of said gear no motion is transmitted to other gears operatively connected therewith.

2. A reduction gear arrangement according to claim 1, further comprising a pinion operatively connecting each pair of said spur gears.

3. A reduction gear arrangement according to claim 2, wherein said pinions include a segment having recesses designed for locking engagement with corresponding projections disposed on that portion of the periphery of said gears coupled with said input drive shaft, said segment being disposed axially behind the toothed surface of said pinions.

4. A reduction gear arrangement according to claim 3, wherein said recesses are provided by the absence of an axial portion of every second tooth of said pinion on said segment designed for locking engagement with said gears coupled with said input drive shaft, said gears including a disk-shaped segment disposed axially behind the toothed surface of said gears to engage with the recesses on said pinion.

5. A reduction gear arrangement according to claim 4, wherein said gears coupled with said input drive shaft are generally disk-shaped and include a toothed segment laterally cranked out from said disk-shape.

6. A reduction gear arrangement according to claim 5, further comprising a worm drive on said input drive shaft and worm gears in engagement therewith, said gear coupled with said input drive shaft being secured for rotation with said worm gear.

7. A reduction gear arrangement according to claim 6, wherein said spur gears and said worm gear are disposed about a common axis.

References Cited

UNITED STATES PATENTS

| | | | |
|---|---|---|---|
| 2,530,996 | 11/1950 | Russell | 74—435 X |
| 2,881,630 | 4/1959 | Opocensky | 74—435 |
| 3,133,462 | 5/1964 | Whipp | 74—435 X |

FOREIGN PATENTS 13,161  3/1916  Great Britain.

DONLEY J. STOCKING, *Primary Examiner.*

LEONARD H. GERIN, *Assistant Examiner.*